United States Patent
Wu et al.

(10) Patent No.: US 10,755,065 B2
(45) Date of Patent: Aug. 25, 2020

(54) SENSOR DEVICE AND FLICKER NOISE MITIGATING METHOD

(71) Applicant: NOVATEK Microelectronics Corp., Hsin-Chu (TW)

(72) Inventors: Yu-Tsung Wu, Taipei (TW); Chi-Ting Chen, Hsinchu (TW); Chih-Lun Cheng, Hsinchu (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 56 days.

(21) Appl. No.: 16/208,472

(22) Filed: Dec. 3, 2018

(65) Prior Publication Data
US 2020/0175248 A1    Jun. 4, 2020

(51) Int. Cl.
G06K 9/00 (2006.01)
H04N 5/367 (2011.01)
G06K 9/40 (2006.01)

(52) U.S. Cl.
CPC ........... *G06K 9/00013* (2013.01); *G06K 9/40* (2013.01); *H04N 5/367* (2013.01)

(58) Field of Classification Search
CPC ....... G06K 9/00013; G06K 9/40; H04N 5/367
See application file for complete search history.

(56) References Cited

U.S. PATENT DOCUMENTS

| | | | | |
|---|---|---|---|---|
| 2013/0259321 A1* | 10/2013 | Aoki | .................. | G06K 9/00885 382/115 |
| 2014/0241598 A1* | 8/2014 | Fedele | ............... | G06K 9/00046 382/125 |
| 2017/0085813 A1* | 3/2017 | Reinhold | ............. | H04N 5/3532 |
| 2018/0129798 A1* | 5/2018 | He | ........................ | G06K 9/0002 |
| 2018/0131880 A1* | 5/2018 | Hicks | ................. | G06K 9/00228 |
| 2018/0189540 A1* | 7/2018 | Chang | .................. | G06K 9/6212 |
| 2018/0260602 A1* | 9/2018 | He | ........................ | G06K 9/0008 |
| 2018/0267666 A1* | 9/2018 | Park | ........................ | G06F 3/0412 |
| 2018/0288301 A1* | 10/2018 | Fu | ........................ | H04N 5/2353 |
| 2019/0012517 A1* | 1/2019 | Li | ........................... | G06K 9/40 |
| 2020/0050818 A1* | 2/2020 | He | ........................ | G06K 9/0004 |
| 2020/0077066 A1* | 3/2020 | Cao | ........................ | H04N 5/2327 |

* cited by examiner

Primary Examiner — Premal R Patel
(74) Attorney, Agent, or Firm — Winston Hsu (57) ABSTRACT

A sensor device includes a fingerprint sensing module, configured to sense a first raw image using a first exposure time; and an exposure time adjusting module. The exposure time adjusting module is configured to obtain a first image according to the first raw image; determine whether the first image comprises a flicker noise; and adjust the first exposure time when the first image comprises the flicker noise, so as to mitigate the flicker noise.

21 Claims, 4 Drawing Sheets

SENSOR DEVICE AND FLICKER NOISE MITIGATING METHOD

BACKGROUND OF THE INVENTION

1. Field of the Invention

The present invention relates to a sensor device and a flicker noise mitigating method capable of mitigating flicker noise, and more particularly, to a sensor device and a flicker noise mitigating method capable of mitigating flicker noise by adjusting exposure time.

2. Description of the Prior Art

With the development of technology, mobile phones, digital cameras, tablet PCs, notebook computers and other electronic devices become more and more popular. The electronic devices are intended for personal use, with certain privacy. The information stored in the electronic device, such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

As the technology of fingerprint identification grows, the fingerprint identification system may be disposed in or under the display panel, which is called in-display or under display fingerprint identification system. In the in-display fingerprint identification system, rolling shutter is usually used. Unfortunately, images capture by a sensor device (of the fingerprint identification system) using rolling shutter usually have flicker noise. Therefore, how to mitigate the flicker noise is a significant objective in the field.

SUMMARY OF THE INVENTION

It is therefore one objective of the present disclosure to provide a sensor device and a flicker noise mitigating method capable of mitigate flicker noise, to improve over disadvantages of the prior art.

An embodiment of the present invention discloses a sensor device, comprising a fingerprint sensing module, configured to sense a first raw image using a first exposure time; and an exposure time adjusting module, configured to perform the following steps: obtaining a first image according to the first raw image; determining whether the first image comprises a flicker noise; and adjusting the first exposure time when the first image comprises the flicker noise to mitigate the flicker noise.

An embodiment of the present invention discloses an image processing device for a sensor device, wherein the sensor device comprises an image fingerprint sensing module configured to sense a first raw image of a fingerprint using a first exposure time, the image processing device comprises an exposure time adjusting module, configured to perform the following steps: obtaining a first image according to the first raw image; determining whether the first image comprises a flicker noise; and adjusting the first exposure time when the first image comprises the flicker noise to mitigate the flicker noise.

An embodiment of the present invention discloses a flicker noise mitigating method, applied in an sensor device The flicker noise mitigating method comprises steps of sensing a first raw image using a first exposure time; obtaining a first image according to the first raw image; determining whether the first image comprises a flicker noise; and adjusting the first exposure time when the first image comprises the flicker noise to mitigate the flicker noise.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
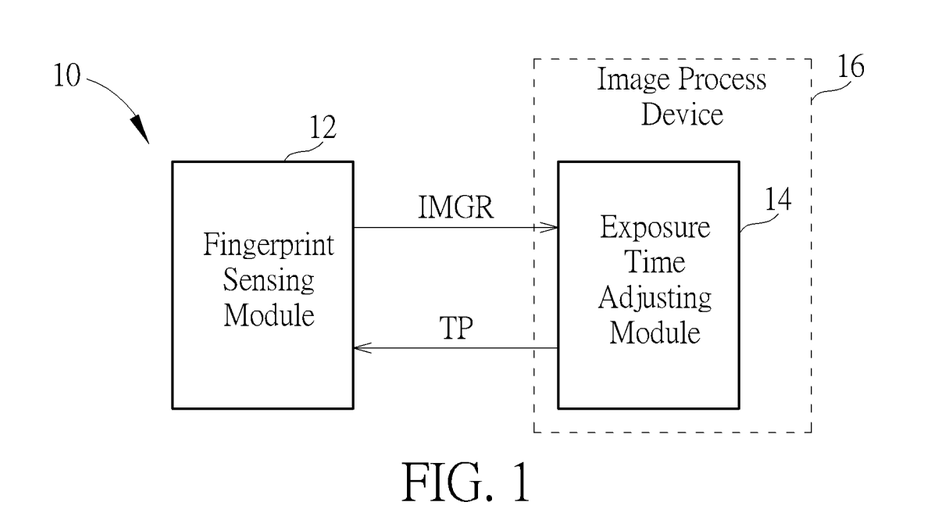
FIG. 1 is a schematic diagram of a sensor device according to an embodiment of the present invention.

FIG. 1 is a schematic diagram of a sensor device 10 according to an embodiment of the present invention. The sensor device 10 can be utilized for an in-display fingerprint recognition/identification system or an under-display fingerprint recognition/identification system. That is, the sensor device 10 is disposed under a display panel within an electronic device (e.g., a phone or a tablet computer). The sensor device 10 comprises a fingerprint sensing module 12 and an exposure time adjusting module 14. The fingerprint sensing module 12 comprises light sensing elements such as photo diodes, which may be arrange as an array. The exposure time adjusting module 14 may be realized by an Application-Specific Integrated Circuit (ASIC) or digital signal processor (DSP). In an embodiment, the exposure time adjusting module 14 may be included in an image processing device 16, where details of the image processing device 16 other than the exposure time adjusting module 14 are omitted herein for brevity. In the embodiment, the sensor device 10 is able to mitigate flicker noise by adjusting an exposure time of the light sensing elements within the fingerprint sensing module 12.

The exposure time of the light sensing element can be a time interval between a reset time and a readout time of the light sensing element. The reset time can correspond to a time at which electrons stored in a potential well of the light sensing element is reset or cleared, and the readout time is corresponding to a time at which electrons stored in the potential well during the exposure time is readout or drained out by the fingerprint sensing module 12. The exposure time of the light sensing element can be controlled by one or more control signals such as a reset signal and a readout signal provided to the light sensing element.

A main reason of the flicker noise is that an exposure time of the light sensing elements (e.g., photo diodes) within the sensor device usually does not match a rate of the light emitting elements (e.g., OLEDs). Different pixel rows would receive different amount of light, which causes light strips and dark strips alternatively appearing in the image sense by the sensor device within the fingerprint identification system. The flicker noise would interfere with the fingerprint identification and therefore degrade an accuracy of the fingerprint identification.

To elaborate more, light emitting elements of the display panel, which may be organic light emitting diodes (OLEDs)), emit light at a certain rate, a.k.a. a frame rate. However, the exposure time of the fingerprint sensing module may not be synchronous or match with the frame rate of the light emitting elements of the display panel. The more mismatch between the exposure time and the frame rate, the severer the flicker noise. In the embodiment, the sensor device 10 is able to detect whether flicker noise exists and adjust the exposure time accordingly, so as to lower the mismatch between the exposure time and the frame rate, such that the flicker noise becomes unnoticeable or even mitigated.

Specifically, the fingerprint sensing module 12 is configured to sense/capture a raw image IMGR using an (initial) exposure time TP, and delivers the raw image IMGR to the exposure time adjusting module 14. The raw image IMGR may be used to generate a fingerprint image. The exposure time adjusting module 14 is configured to perform flicker noise detection and adjust the exposure time TP for the fingerprint sensing module 12 once it detects the flicker noise in the raw image IMGR. The exposure time adjusting module 14 adjusts the exposure time TP according to result(s) of the flicker noise detection iteratively. Preferably but not limitedly, the detection and adjusting process may be iterated until a predetermined condition is meet. The predetermined condition may be that the flicker noise becomes unnoticeable or is mitigated. The exposure time adjusting module 14 would output the adjusted exposure time TP to the fingerprint sensing module 12.

Figure 2:
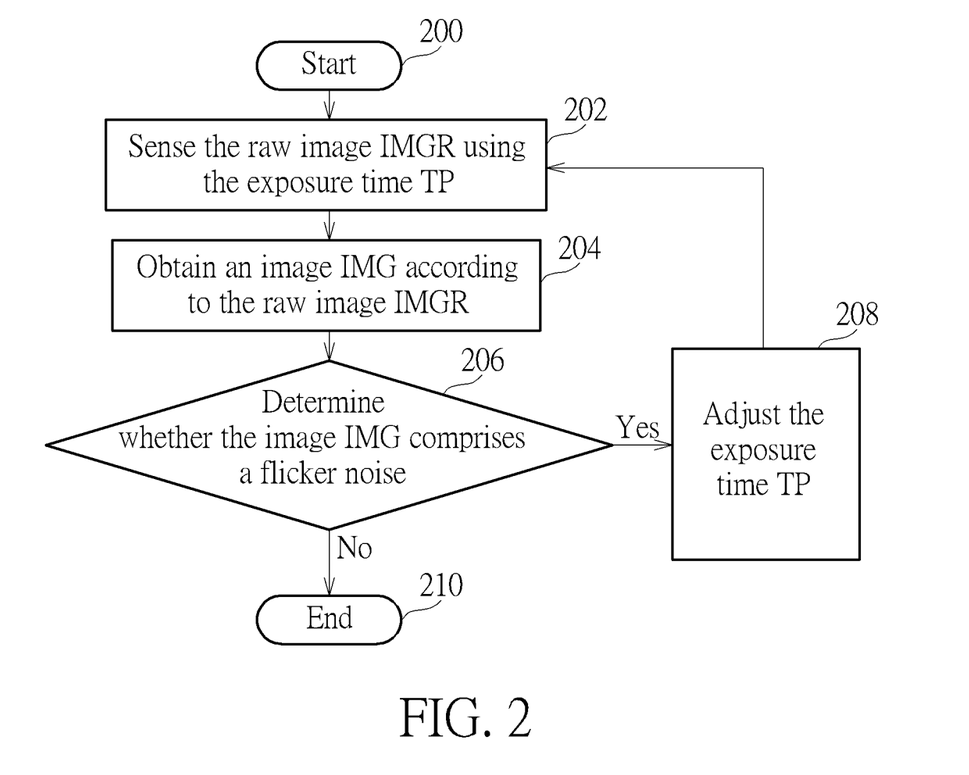
FIG. 2 is a schematic diagram of a flicker noise mitigating process according to an embodiment of the present invention.

In detail, the sensor device 10 executes a flicker noise mitigating process 20, which is shown in FIG. 2. The flicker noise mitigating process 20 comprises the following steps.

Step 200: Start.

Step 202: Sense the raw image IMGR using the exposure time TP.

Step 204: Obtain an image IMG according to the raw image IMGR.

Step 206: Determine whether the image IMG comprises a flicker noise. If yes, go to Step 208; otherwise, go to Step 210.

Step 208: Adjust the exposure time TP.

Step 210: End.

At the beginning, in step 202, the fingerprint sensing module 12 may sense a raw image IMGR_1 using an initial exposure time TP_1. The initial exposure time TP_1 may be set according to the frame rate of light emitting elements of the display panel. Suppose that the frame rate of the OLEDs is 60 Hz with 5% tolerance, i.e., the actual frame rate may lie between 57 Hz and 63 Hz. In an embodiment, the fingerprint sensing module 12 may choose the initial exposure time TP_1 to be corresponding to the lowest possible/feasible frame rate, e.g., 57 Hz, to sense the raw image IMGR_1 at the first time. For example, the fingerprint sensing module 12 may choose the initial exposure time TP_1 as TP_1=1/(2*57) second. In another embodiment, the initial exposure time TP_1 may be set to be corresponding to the highest possible/feasible frame rate, e.g., 63 Hz.

In step 204, the exposure time adjusting module 14 can obtain an image IMG according to the raw image IMGR. In obtaining the image IMG according to the raw image IMGR, the exposure time adjusting module 14 may remove a fixed pattern noise (FPN) from the raw image IMGR_1. The FPN is a noisy image caused by different offset values of the front end modules (e.g., amplifier) corresponding to different pixel rows, and/or by the structure/deployment of the OLEDs of the panel. The FPN is unavoidable when performing in-display fingerprint sensing and would be constant over different times at which the fingerprint sensing module 12 senses the images. Details of the FPN is known in the art and omitted herein for brevity. After the FPN is removed from the raw image IMGR_1, an image IMG_1 is obtained.

In step 206, the exposure time adjusting module 14 performs flicker noise detection on the image IMG_1. That is, the exposure time adjusting module 14 determines whether the image IMG_1 contains the flicker noise. Details of Step 206 regarding how flicker noise is detected would be described later on.

When the exposure time adjusting module 14 determines that the image IMG_1 does have flicker noise, the process proceeds to Step 208, in which the exposure time adjusting module 14 generates an adjusted exposure time TP_2. The adjusted exposure time TP_2 may be set as TP_2=TP_1+d, where d is a step size for adjusting the exposure time TP. The value of the step size d may be chosen according to practical design requirements.

Then, the fingerprint sensing module 12 would sense a raw image IMGR_2 using an adjusted exposure time TP_2 (Step 202), the exposure time adjusting module 14 would remove the FPN from the raw image IMGR_2 (Step 204) to obtain an FPN-free image IMG_2, and the time adjusting module 14 would again determine whether the FPN-free image IMG_2 comprises flicker noise (Step 206). Similarly, if the exposure time adjusting module 14 determines that the image IMG_2 have flicker noise, the exposure time adjusting module 14 generates an adjusted exposure time TP_3, which may be set as TP_3=TP_2+d (Step 208).

Steps 202, 204, and 206 may be iteratively executed by the sensor device 10, until the $n^{th}$ iteration, at which the time adjusting module 14 detects no flicker noise in an image IMG_n, where the image IMG_n is an FPN reduction result of a raw image IMGR_n, the raw image IMGR_n is sensed by the fingerprint sensing module 12 using an adjusted exposure time TP_n, and the adjusted exposure time TP_n may be TP_n=TP_1+(n−1)*d. In other words, after executing n iterations of Steps 202, 204, and 206, flicker noise within the FPN-free image IMG_n become unnoticeable, i.e., the exposure time adjusting module 14 determines that the image IMG_n contains no flicker noise. The adjusted exposure time TP_n would (substantially) match with the actual frame rate. The fingerprint sensing module 12 may keep sensing images, especially the images containing fingerprint image, using the resulting exposure time TP_n.

In an embodiment, the flicker noise mitigating process 20 may be executed when the user registers his/her fingerprint to the electronic device in which the sensor device 10 is disposed. After the fingerprint registration and the flicker noise mitigating process 20 are done, the fingerprint sensing module 12 keeps sensing images by the resulting exposure time TP_n. Thereby, the flicker noise is mitigated, which is beneficial for performing the fingerprint identification.

Details of Step 206 of FIG. 2 regarding how flicker noise is detected would be described as follows. The image IMG comprises a plurality of pixel rows, and each pixel row comprises a plurality of row pixels. Herein, the image IMG represents the image IMG_1-IMG_n corresponding to the n iterations. In some embodiments, the time adjusting module 14 can convert the image IMG' to a representative pixel column so as to determine whether the image IMG comprises the flicker noise based on a plurality of values of the representative pixel column. In an embodiment, the time adjusting module 14 may aggregate the plurality of row pixels within each row pixel array so as to obtain the representative pixel column comprising a plurality of representative column pixels. Then, the time adjusting module 14 obtains a variance VAR, or equivalently, a standard deviation, of the plurality of representative column pixels. Finally, the time adjusting module 14 may determine whether the image IMG comprises the flicker noise according to the variance VAR.

Figure 3:
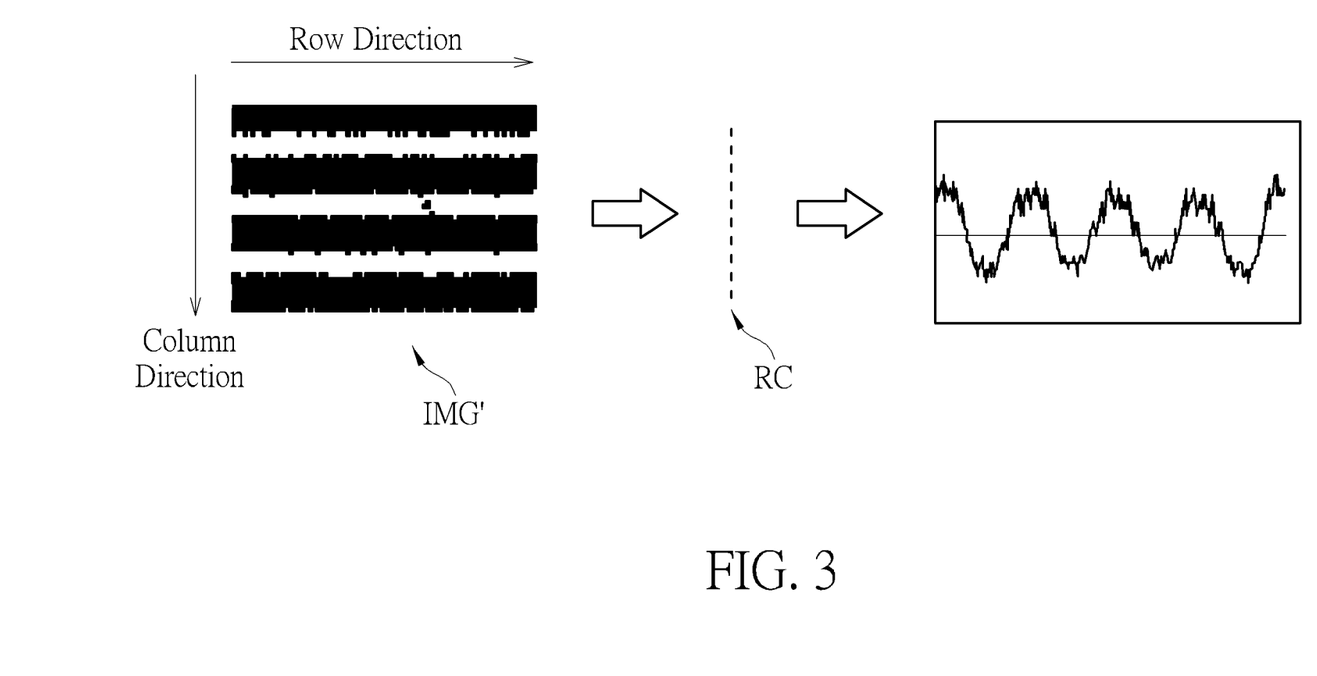
FIG. 3 is a schematic diagram of an image and a representative pixel column according to an embodiment of the present invention.

FIG. 3 is a schematic diagram of an image IMG' and a representative pixel column RC. The image IMG' is an illustrative embodiment of the image IMG. In FIG. 3, a horizontal direction is parallel to a row direction (i.e., a direction of pixel row) and a vertical direction is parallel to a column direction (i.e., a direction of pixel column). The image IMG' is a two-dimensional (2D) array, whose size is I×J, which means that the image IMG' comprises I pixel rows and J pixel columns. IMG'(i,j) represents a pixel and/or its corresponding pixel value located at the $i^{th}$ row and the $j^{th}$ column of the image IMG. Each pixel row, denoted as IMG'(i,:), comprises row pixels IMG'(i,1)-IMG'(i,J). The representative pixel column RC is a one-dimensional (1D) array, where a representative column pixel RC(i) represents the $i^{th}$ pixel (value) of the representative pixel column RC.

The time adjusting module 14 may obtain the representative pixel column RC by summing or averaging over the row pixels IMG'(i,1)-IMG'(i,J) corresponding to the pixel row IMG'(i,:), for i=1, . . . , I. In other words, the time adjusting module 14 may obtain the $i^{th}$ value RC(i) of the representative pixel column RCas according to:

RC(i)=sum(IMG'(i,:))=IMG'(i,1)+ . . . +IMG'(i,J) or
RC(i)=ave(IMG'(i,:))=(IMG'(i,1)+ . . . +IMG'(i,J))/J,
for i=1, . . . , I, where sum( ) and ave ( ) represent a summation operation and an average operation, respectively. A plot of the representative pixel column RC, or of the representative column pixels RC(1)-RC(I), is illustrated at the rightmost of FIG. 3.

Then, the time adjusting module 14 may compute the variance VAR of the representative column pixels RC(1)-RC(I), i.e., VAR=var (RC)=var (RC(1), . . . , RC(I)), wherein var( ) represents a variance operation. In an embodiment, if the variance VAR is greater than a certain threshold, the time adjusting module 14 determines the image IMG comprises the flicker noise. Otherwise, the time adjusting module 14 determines the image IMG comprises no flicker noise. In other embodiments, the time adjusting module 14 may determine whether the image IMG comprises the flicker noise or not according to other conditions.

In another embodiment, the time adjusting module 14 may perform flicker noise detection by determining whether the image IMG comprises at least a light strip and whether the image IMG comprises at least a dark strip. The time adjusting module 14 would determine whether the image IMG comprises the flicker noise according to a total number f_tot of the light strip(s) and the dark strip(s). For example, the time adjusting module 14 would determine that the image IMG comprises the flicker noise when the total number f_tot of the light strip(s) and the dark strip(s) is greater than a threshold of total strips STP_th.

Furthermore, in determining whether the image IMG comprises a light strip or not, the time adjusting module 14 may make the determination according to a total number of a plurality of "light pixel rows" sequentially/consecutively arranged along the column direction. The light pixel row can be defined based on a predetermine condition, which for example, may be that each of a plurality of pixel values within the light pixel row is greater than a light brightness threshold L_th. The time adjusting module 14 may determine that the image IMG comprises a light strip when it determines that a total row number of the sequentially/consecutively-arranged plurality of light pixel rows (i.e., light strips) is greater than a strip width threshold W_STP.

Similarly, the time adjusting module 14 determines that the image IMG comprises a dark strip when time adjusting module 14 determines that a total row number of a plurality of "dark pixel rows" sequentially/consecutively arranged along the column direction is greater than the strip width threshold W_STP. The dark pixel row can be defined based on a predetermine condition, which for example, may be that the pixel values of the pixels within each of the plurality of dark pixel rows (dark strips) is less than a dark brightness threshold D_th.

Take the image IMG' illustrated in FIG. 3 as an example. Given that each pixel value is represented by 8 bits, ranging from 0 to 255. The time adjusting module 14 may arbitrarily choose a certain pixel column, denoted as IMG'(:,j). The time adjusting module 14 scans through the entire pixel column IMG'(:,j), i.e., to evaluate IMG'(i,j) from i=1 to i=I, in order to check whether each pixel value IMG'(i,j) is greater than the light brightness threshold L_th or to check whether each pixel value IMG'(i,j) is less than the dark brightness threshold D_th. The light brightness threshold L_th may be 224 and the dark brightness threshold D_th may be 32, for example, but not limited thereto. For convenience, the pixel with the pixel value greater than light brightness threshold L_th is defined as a light pixel, and the pixel with the pixel value less than dark brightness threshold D_th is defined as dark pixel.

If the time adjusting module 14 determines that there are more than W_STP number of light pixels consecutively gathered within the pixel column IMG'(:,j), then the time adjusting module 14 would determine that the image IMG' comprises a light strip. For example, if the time adjusting module 14 determines that the consecutively gathered pixels IMG'(a,j)–IMG'(a+W_STP,j) are all light pixels, then the time adjusting module 14 would determine that the image IMG' comprises a light strip, where "a" is an integer. Similarly, if the time adjusting module 14 determines that there are more than W_STP number of dark pixels consecutively gathered within the pixel column IMG'(:,j), then the time adjusting module 14 would determine that the image IMG' comprises a dark strip. For example, if the time adjusting module 14 determines that the consecutively gathered pixels IMG'(a,j)-IMG'(a+W_STP,j) are all dark pixels, then the time adjusting module 14 would determine that the image IMG' comprises a dark strip.

In another perspective, if the time adjusting module 14 determines that the consecutively gathered pixels IMG'(a,j)-IMG'(a+W,j) are all light pixels, meaning that W light pixel rows are consecutively arranged along the column direction within the pixel column IMG'(:,j), and determines that the number W is greater than or equal to the strip width threshold W_STP, then the time adjusting module 14 would determine that the image IMG' comprises a light strip.

Similarly, if the time adjusting module 14 determines that the consecutively-arranged pixels IMG'(a,j)-IMG'(a+W,j) are all dark pixels, meaning that W dark pixel rows are consecutively arranged along the column direction within the pixel column IMG'(:,j), and determines that the number W is greater than or equal to the strip width threshold W_STP, then the time adjusting module 14 would determine that the image IMG' comprises a dark strip.

After the time adjusting module 14 determines the existence of the light strip(s) and the dark strip(s), the time adjusting module 14 may accumulate the total number f_tot of the light strip(s) and the dark strip(s). If the total number f_tot is greater than the threshold of total strips STP_th, then the time adjusting module 14 determines the image IMG comprises the flicker noise. Otherwise, the time adjusting module 14 determines the image IMG comprises no flicker noise. The threshold of total strips STP_th may, for example, be 3, but not limited thereto.

Basically, the time adjusting module 14 determines whether any light strip(s) and any dark strip(s) exist in the image IMG. If yes, the time adjusting module 14 obtains the total number f_tot of the light strip(s) and the dark strip(s) and determines whether the image IMG contains the flicker noise according to the total number f_tot.

In short, the sensor device 10 may perform flicker noise detection and adjust the exposure time according to the result of flicker noise detection. Furthermore, the sensor device 10 may perform flicker noise detection either by aggregating the row pixels within the image IMG as the representative pixel column RC and calculating the variance VAR of the representative pixel column RC, or by detecting whether the image IMG contains the light strip(s) and the dark strip(s) and determining whether the image IMG contains the flicker noise according to the total number f_tot of the light strip(s) and the dark strip(s). Compared to the prior art, the sensor device 10 is able to mitigate the flicker noise by adjusting the exposure time of the light sensing elements within fingerprint sensing module 12.

Notably, the above embodiments are utilized for illustrating the concept of the disclosure. Those skilled in the art may make modifications and alterations accordingly, and not limited herein. For example, in Step 206, the time adjusting module 14 may merely detect whether the light strip(s) exist in the image IMG and check if a total number of the light strip(s) is greater than the threshold of total strips STP_th. If yes, the time adjusting module 14 determines that the image IMG contains the flicker noise. Otherwise, the time adjusting module 14 determines that the image IMG contains no flicker noise. Similarly, the time adjusting module 14 may merely detect whether the dark strip(s) exist in the image IMG and check if a total number of the dark strip(s) is greater than threshold of total strips STP_th. If yes, the time adjusting module 14 determines that the image IMG contains the flicker noise. Otherwise, the time adjusting module 14 determines that the image IMG contains no flicker noise.

Figure 4:
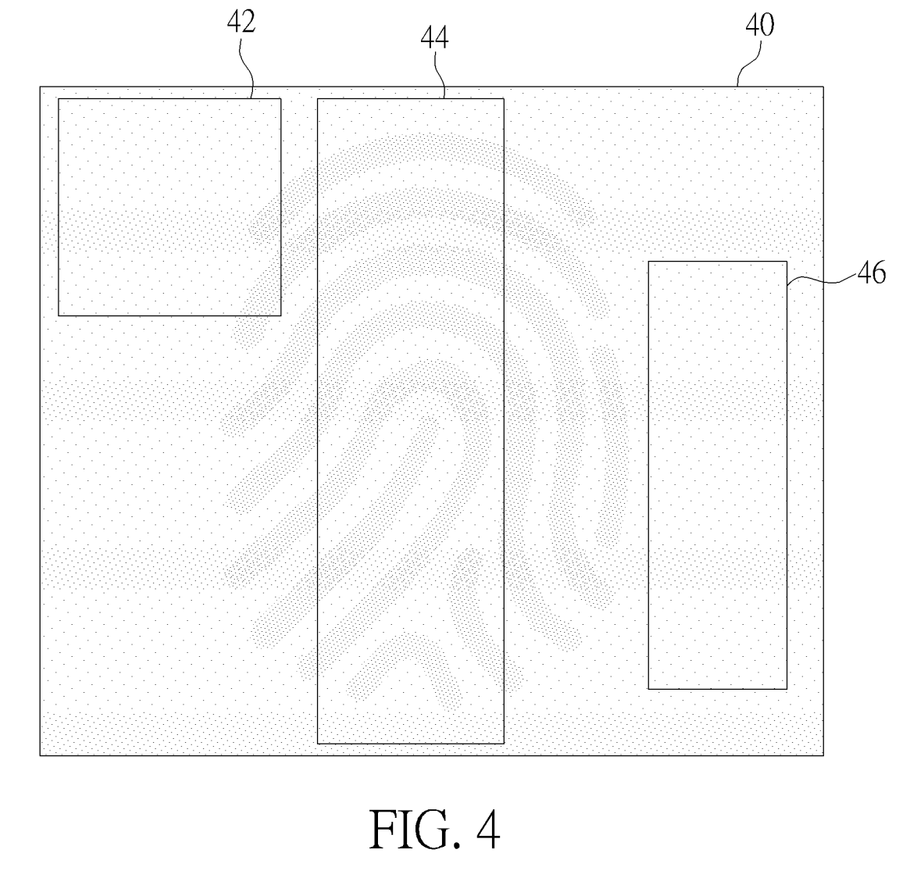
FIG. 4 illustrates an entire raw image and partial raw images according to an embodiment of the present invention.

In addition, the raw image IMGR may be an entire raw image sensed by the fingerprint sensing module 12, or a partial raw image sensed by the fingerprint sensing module 12. For example, FIG. 4 illustrates an entire raw image 40 sensed by the fingerprint sensing module 12. Partial raw images 42, 44 and 46 are segmented portions of the entire raw image sensed 40. Each of the entire raw image 40 and the partial raw images 42, 44 and 46 can be utilized as the raw image IMG in Step 202.

Figure 5:
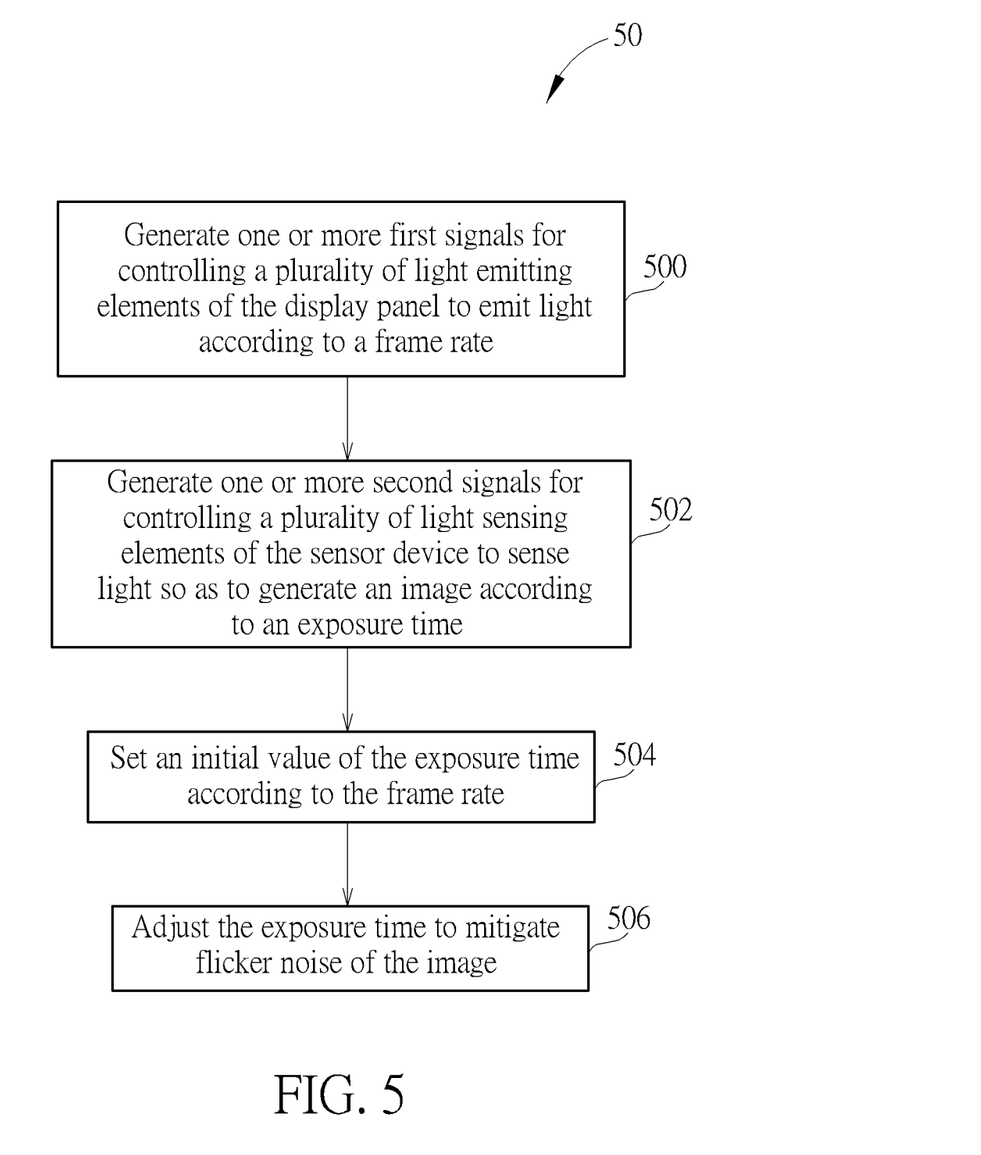
FIG. 5 is a schematic diagram of a flicker noise mitigating process according to an embodiment of the present invention.

In some embodiments, a flicker noise mitigating method can be applied in an electronic device which can comprise a display panel and a sensor device. FIG. 5 is a schematic diagram of a flicker noise mitigating process according to an embodiment of the present invention. As shown, the flicker noise mitigating method can comprise the following steps:

Step 500: Generate one or more first signals for controlling a plurality of light emitting elements of the display panel to emit light according to a frame rate.

Step 502: Generate one or more second signals for controlling a plurality of light sensing elements of the sensor device to sense light so as to generate an image according to an exposure time.

Step 504: Set an initial value of the exposure time according to the frame rate.

Step 506: Adjust the exposure time to mitigate flicker noise of the image.

In different implementations, the steps 500-506 may be sequentially or simultaneously performed. More steps can be also inserted between any two of the steps. Details of each step can be referred to the descriptions in the other embodiments and are therefore omitted for brevity.

In summary, the sensor device of the embodiments performs flicker noise detection and adjusts the exposure time according to the result of flicker noise detection. Consequently, the sensor device of the embodiments is able to mitigate the flicker noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensor device, comprising:
   a fingerprint sensing module, configured to sense a first raw image using a first exposure time; and
   an exposure time adjusting module, configured to perform the following steps:
   obtaining a first image according to the first raw image;
   determining whether the first image comprises a flicker noise; and
   adjusting the first exposure time when the first image comprises the flicker noise to mitigate the flicker noise;
   wherein the flicker noise causes light strips and dark strips alternatively appearing in the first image.

2. The sensor device of claim 1, wherein in the obtaining the first image, wherein the exposure time adjusting module is further configured to perform a fixed pattern noise reduction operation on the first raw image to generate the first image.

3. The sensor device of claim 1, wherein the first image comprises a plurality of pixel rows each comprising a plurality of row pixels, and the exposure time adjusting module is further configured to perform the following steps, to determine whether the first image comprises the flicker noise:
   aggregating the plurality of row pixels within the each row pixel array to obtain a representative pixel column, wherein the representative pixel column comprises a plurality of representative column pixels;
   obtaining a variance of the plurality of representative column pixels; and
   determining whether the first image comprises the flicker noise according to the variance.

4. The sensor device of claim 3, wherein the exposure time adjusting module is further configured to perform the following step, to determine whether the first image comprises the flicker noise according to the variance:

determining that the first image comprises the flicker noise when the variance is greater than a threshold value.

5. The sensor device of claim 1, wherein the exposure time adjusting module is further configured to perform the following steps, to determine whether the first image comprises the flicker noise:
   determining whether the first image comprises a light strip;
   determining whether the first image comprises a dark strip; and
   determining whether the first image comprises the flicker noise according to a total number of the light strip and the dark strip.

6. The sensor device of claim 5, wherein the determination that the first image comprises the flicker noise according to a total number of the light strip and the dark strip comprises:
   determining that the first image comprises the flicker noise when the total number of the light strip and the dark strip is greater than a threshold of total strips.

7. The sensor device of claim 5, wherein the determination of whether the first image comprises a light strip comprises:
   determining whether the light strip comprises a plurality of light pixel rows sequentially arranged in a column direction, wherein pixel values corresponding to pixels within the light strip are greater than a light brightness threshold; and
   determining whether a total row number of each pixel row within the light strip is greater than a strip width threshold.

8. The sensor device of claim 5, wherein the determination of whether the first image comprises a light strip comprises:
   determining whether the light strip comprises a plurality of dark pixel rows sequentially arranged in a column direction, wherein pixel values corresponding to pixels within the dark strip are less than a dark brightness threshold; and
   determining whether a total row number of each pixel row within the dark strip is greater than a strip width threshold.

9. The sensor device of claim 1, wherein the fingerprint sensing keeps module sensing images using the first exposure time when the exposure time adjusting module determines that the first image comprises no flicker noise.

10. The sensor device of claim 1, wherein the fingerprint sensing module is further configured to sense a second raw image using a second exposure time, the second exposure time is an adjusted exposure time which is adjusted based on the first exposure time, and the exposure time adjusting module is further configured to perform the following steps:
    receiving a second image, wherein the second image is related to the second raw image; and
    determining whether the second image comprises a flicker noise;
    wherein the fingerprint sensing module keeps sensing images using the second exposure time when the exposure time adjusting module determines that the second image comprises no flicker noise.

11. The sensor device of claim 10, wherein the exposure time adjusting module is further configured to perform the following step:
    performing a fixed pattern noise cancelling operation on the second raw image, to generate the second image.

12. The sensor device of claim 1, wherein the exposure time is a time interval between a reset time and a readout time of a light sensing element within the fingerprint sensing module.

13. The sensor device of claim 12, wherein the light sensing element is a photo diode.

14. The sensor device of claim 1, wherein the sensor device is disposed under a display panel of an electronic device.

15. An image processing device for a sensor device, wherein the sensor device comprises an image fingerprint sensing module configured to sense a first raw image of a fingerprint using a first exposure time, the image processing device comprises:
    an exposure time adjusting module, configured to perform the following steps:
      obtaining a first image according to the first raw image;
      determining whether the first image comprises a flicker noise; and
      adjusting the first exposure time when the first image comprises the flicker noise to mitigate the flicker noise;
    wherein the flicker noise causes light strips and dark strips alternatively appearing in the first image.

16. The image processing device of claim 15, wherein the first image comprises a plurality of pixel rows each comprising a plurality of row pixels, and the exposure time adjusting module is further configured to perform the following steps, to determine whether the first image comprises the flicker noise:
    aggregating the plurality of row pixels within the each row pixel array to obtain a representative pixel column, wherein the representative pixel column comprises a plurality of representative column pixels;
    obtaining a variance of the plurality of representative column pixels; and
    determining whether the first image comprises the flicker noise according to the variance.

17. The image processing device of claim 15, wherein the exposure time adjusting module is further configured to perform the following steps, to determine whether the first image comprises the flicker noise:
    determining whether the first image comprises a light strip;
    determining whether the first image comprises a dark strip; and
    determining whether the first image comprises the flicker noise according to a total number of the light strip and the dark strip.

18. A flicker noise mitigating method, applied in a sensor device, the flicker noise mitigating method comprising:
    sensing a first raw image using a first exposure time;
    obtaining a first image according to the first raw image;
    determining whether the first image comprises a flicker noise; and
    adjusting the first exposure time when the first image comprises the flicker noise to mitigate the flicker noise;
    wherein the flicker noise causes light strips and dark strips alternatively appearing in the first image.

19. The flicker noise mitigating method of claim 18, wherein the first image comprises a plurality of pixel rows each comprising a plurality of row pixels, and the step of determining whether the first image comprises the flicker noise comprises:
    aggregating the plurality of row pixels within the each row pixel array and to obtain a representative pixel column, wherein the representative pixel column comprises a plurality of representative column pixels;

obtaining a variance of the plurality of representative column pixels; and determining whether the first image comprises the flicker noise according to the variance.

20. The sensor of claim 18, wherein the step of determining whether the first image comprises the flicker noise comprises:

determining whether the first image comprises a light strip;

determining whether the first image comprises a dark strip; and determining whether the first image comprises the flicker noise according to a total number of the light strip and the dark strip.

21. A flicker noise mitigating method, applied in an electronic device comprising a display panel and a sensor device, the flicker noise mitigating method comprising:

generating one or more first signals for controlling a plurality of light emitting elements of the display panel to emit light according to a frame rate;

generating one or more second signals for controlling a plurality of light sensing elements of the sensor device to sense light so as to generate an image according to an exposure time;

setting an initial value of the exposure time according to the frame rate; and adjusting the exposure time to mitigate flicker noise of the image;

wherein the flicker noise causes light strips and dark strips alternatively appearing in the image.

* * * * *